March 5, 1940.   H. R. McGREW   2,192,838
FISH ENTRAILS EXTRACTOR
Filed June 21, 1939   2 Sheets-Sheet 1
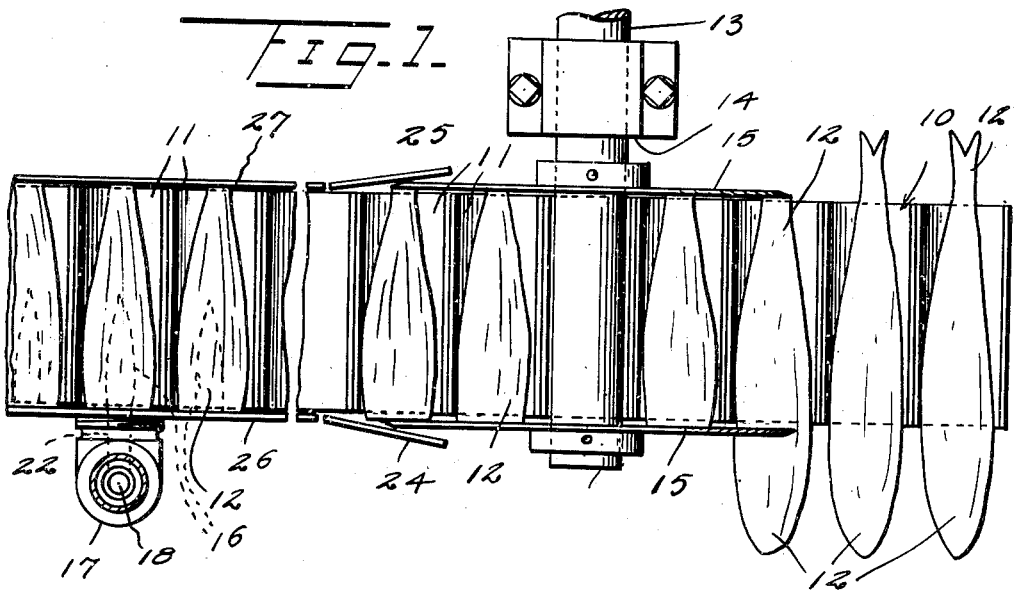
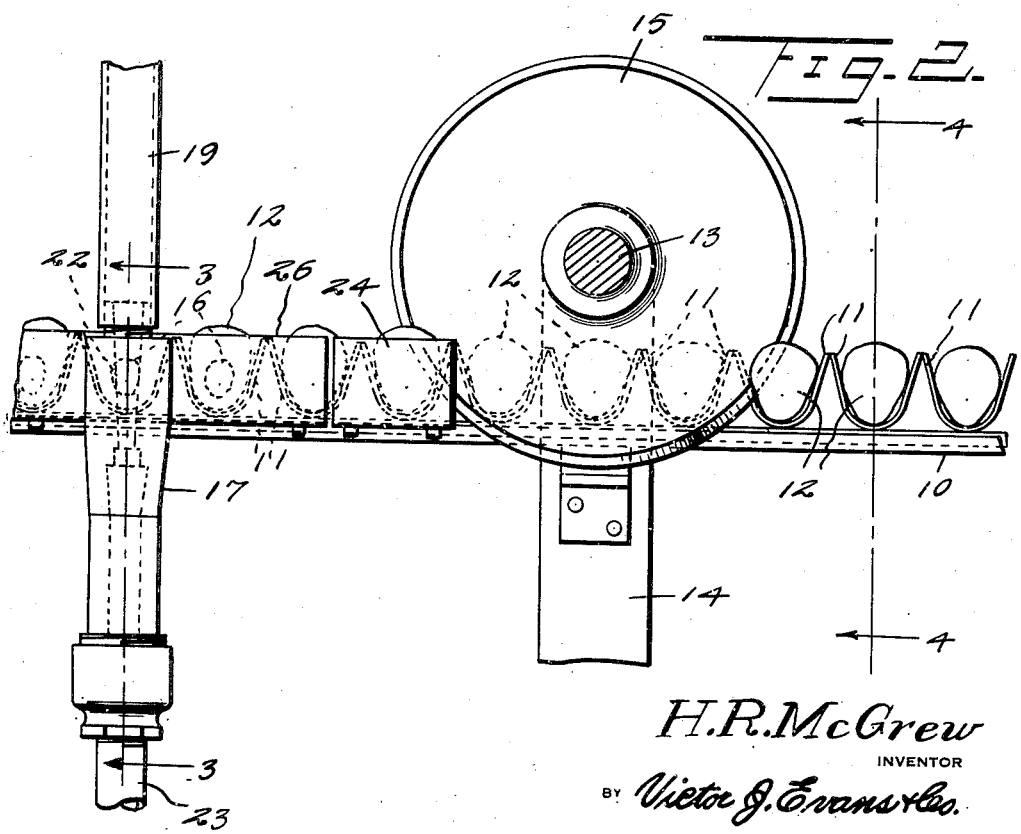
H. R. McGrew
INVENTOR
BY Victor J. Evans & Co.
ATTORNEYS

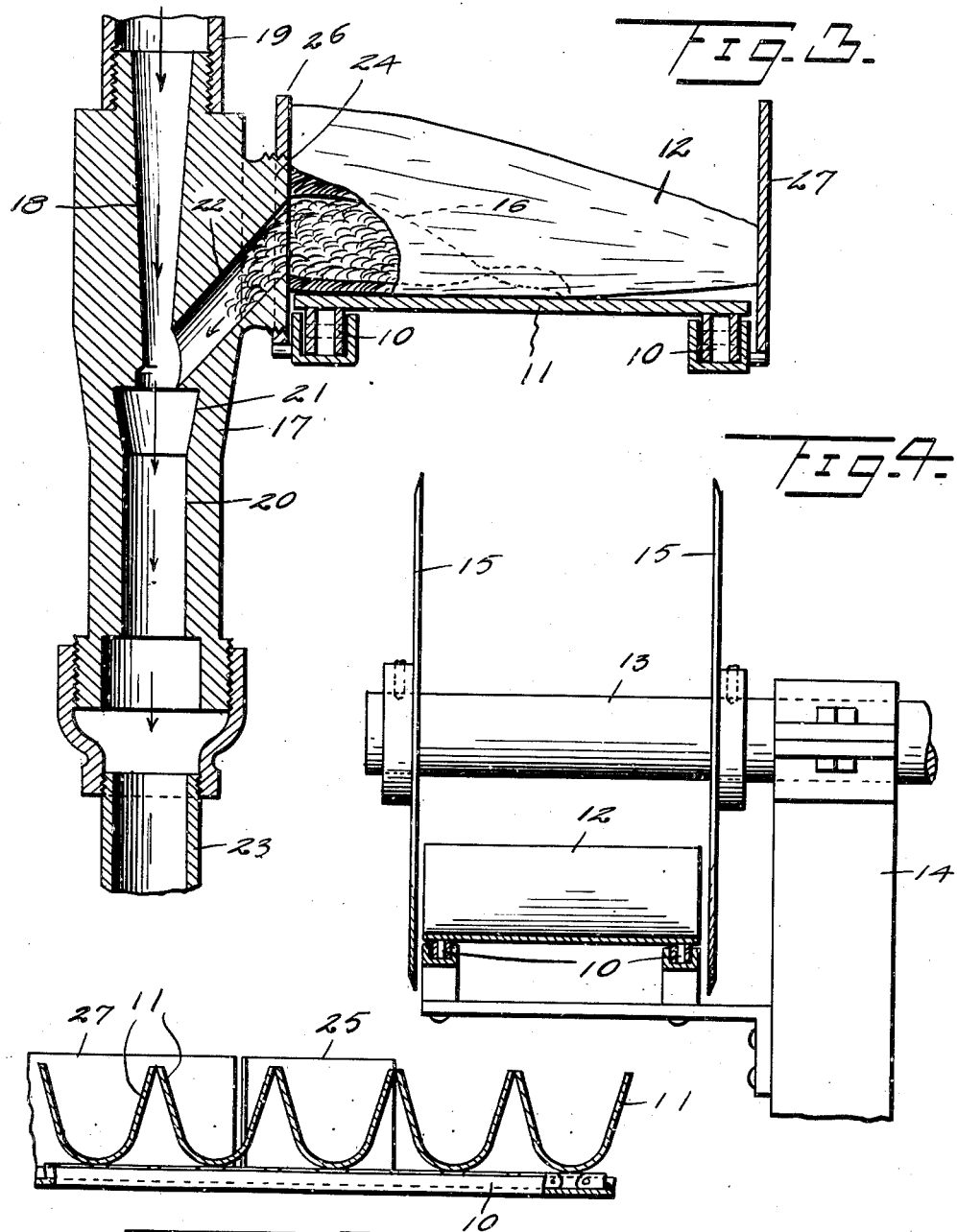

Patented Mar. 5, 1940

2,192,838

UNITED STATES PATENT OFFICE 2,192,838

FISH ENTRAILS EXTRACTOR

Henry R. McGrew, Monterey, Calif.

Application June 21, 1939, Serial No. 280,394

2 Claims. (Cl. 17—3)

This invention relates to a fish entrails extractor and has for an object to provide a device for removing the head, tail and entrails of fish at high speed.

A further object is to provide means for slightly compressing the fish lengthwise after the head has been severed to expose the entrails cavity and provide a tight seal so that a suction can be most effectively used to thoroughly remove the entrails of fish of the type in which the entrails are not too strongly attached to the body of the fish, such as California sardines and mackerel.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a fragmentary plan view of a fish entrails extractor constructed in accordance with the invention.

Figure 2 is a front elevation of the extractor shown in Figure 1 with parts in section.

Figure 3 is an enlarged longitudinal sectional view taken on the line 3—3 of Figure 2 and showing the hydraulic extractor.

Figure 4 is a cross sectional view taken on the line 4—4 of Figure 2 and showing the head and tail severing knives and the endless carrier with the fish receiving pockets.

Figure 5 is a detail longitudinal sectional view of the endless carrier and showing the guide plates for compressing the fish longitudinally preparatory to extracting the entrails.

Referring now to the drawings in which like characters of reference designate similar parts in the various views, 10 designates an endless carrier having transversely disposed fish receiving pockets 11 open at both ends and adapted to support the fish 12 with the heads and tails projecting beyond the sides of the carrier as best shown in Figure 1. A driven shaft 13 is supported upon a standard 14 and extends transversely of the carrier above the pockets, as best shown in Figure 4. A pair of knives 15 of the disc type are fixed to the driven shaft and overlap the end edges of the pockets. The knives 15 are revolved at a speed great enough to make a clean fast cut and the chain of fish pockets 11 traverses the knives at a speed commensurate with machine output.

The fish must be placed belly downward in the pockets, since the thickness of the lower abdominal walls varies from about 1/16 to 1/8 of an inch only among various sizes of sardines, while the back walls vary considerably in thickness. By placing the fish belly downward the entrails cavity shown at 16 in Figure 3 will be exposed when the head of the fish is severed, and will aline accurately with the vacuum orifice 22.

A hydraulic ejector 17 is mounted in upright position adjacent to one side of the endless carrier and is provided with an axial tapered water nozzle 18 which is supplied with water under pressure from a supply pipe 19 secured to the top of the nozzle. The bore 20 of the ejector is of uniform greater diameter than the water nozzle and is provided with a flared upper end 21 which communicates with the discharge end of the water nozzle to provide sufficient space for the fish entrails passing freely from the ejector without clogging. A vacuum orifice 22 is formed in the body of the ejector and extends obliquely from the outlet end of the water nozzle to a point in the side of the ejector body, in registration with the entrails opening of the fish. The water jet passing through the nozzle creates a suction in the vacuum orifice to completely and thoroughly withdraw the entrails into the hydraulic ejector, whence they are discharged through the medium of a discharge pipe 23.

Front and back guide plates 24 and 25 are mounted stationary upon a stationary part of the endless carrier and these plates are inclined from the knives toward the ends of the pockets so as to compress the fish endwise as the fish pass through the knives, as shown in Figure 1, and deliver the fish to guide plates 26 and 27 which maintain this slight compression upon the cut fish as they pass between these plates and insure a close contact of the entrails opening with the suction orifice.

In operation, at the instant when the vacuum orifice is completely closed by the abutting body of the fish, the full effect of the vacuum takes place, thereby pouring the entrails of the fish into the vacuum orifice 22, through the hydraulic ejector 17, and thence out through the discharge pipe 23. In practice it is found that when the machine is in operation, with the cutting knives revolving at 700 R. P. M. and the endless carrier traveling 25 feet per minute, the output is about 175 cut and cleaned fish per minute with the hydraulic ejector using 20 gallons of water per minute at 125 pounds pressure.

From the above description it is thought that the construction and operation of the invention will be fully understood without further explanation.

What is claimed is:

1. A fish entrails extractor comprising an endless carrier having transversely disposed fish receiving pockets open at both ends, disc knives rotatably mounted to overlap the open ends of the pockets for severing the heads and tails of fish during travel of the endless carrier, a hydraulic ejector having a vacuum orifice, and guide plates on the sides of the carrier for compressing the fish longitudinally after they pass beyond the knives to insure close contact of the entrails opening of the fish with the vacuum orifice.

2. A fish entrails extractor comprising an endless carrier having transversely disposed fish receiving pockets, knives mounted adjacent the sides of the carrier for intercepting the fish and severing the heads and tails thereof, a hydraulic ejector disposed laterally of the carrier and having inclined vacuum orifice opening through the side thereof, stationary guide plates disposed at the sides of the carrier and adapted to slightly compress the fish during travel past the vacuum orifice to insure close contact of the entrails opening of the fish with the vacuum orifice, and inclined guide plates disposed adjacent the carrier for slightly compressing the fish longitudinally and delivering the same in compressed condition to the first named guide plates.

HENRY R. McGREW.